(12) United States Patent
McElvaney

(10) Patent No.: US 7,139,371 B2
(45) Date of Patent: Nov. 21, 2006

(54) REMOTE INTERNET TELEPHONY DEVICE

(75) Inventor: David McElvaney, Sparks, MD (US)

(73) Assignee: Riparius Ventures, LLC, Timonium, MD (US)

( * ) Notice: Subject to any disclaimer, the term of this patent is extended or adjusted under 35 U.S.C. 154(b) by 0 days.

(21) Appl. No.: 11/299,439

(22) Filed: Dec. 13, 2005

(65) Prior Publication Data

US 2006/0093102 A1    May 4, 2006

Related U.S. Application Data

(63) Continuation of application No. 09/734,163, filed on Dec. 11, 2000, which is a continuation-in-part of application No. 08/734,857, filed on Oct. 23, 1996, now Pat. No. 6,859,525.

(51) Int. Cl.
*H04M 1/64* (2006.01)
*H04L 12/66* (2006.01)

(52) U.S. Cl. ................ 379/88.17; 379/88.11; 370/352; 370/401; 370/463

(58) Field of Classification Search ............... 379/67.1, 379/72, 76, 88.17, 88.18; 370/352, 463, 370/522
See application file for complete search history.

(56) References Cited

U.S. PATENT DOCUMENTS

| 6,006,088 A | 12/1999 | Couse ......................... 455/415 |
| 6,438,384 B1 | 8/2002 | Chen .......................... 455/462 |
| 6,728,546 B1 * | 4/2004 | Peterson et al. ............. 455/462 |
| 6,731,751 B1 * | 5/2004 | Papadopoulos ........ 379/399.01 |
| 6,826,174 B1 * | 11/2004 | Erekson et al. ............. 370/352 |
| 2003/0039242 A1 * | 2/2003 | Moore, Jr. ................... 370/354 |
| 2005/0180406 A1 * | 8/2005 | Sagiv ......................... 370/353 |

FOREIGN PATENT DOCUMENTS

JP          06-311255      *  4/1994

OTHER PUBLICATIONS

PR Newswire, 'Creative Makes the Call with VoIP Blaster' [online] Nov. 15, 2000 [retrieved on Mar. 2, 2006]. Retrieved from the Internet:<URL:http://proquest.umi.com/pqdweb?did=63796300 &sid=1&Fmt=3&clientId=19649&RQT=309&VName=PQD>.*
Business Wire, 'AT&T Labs Trials Netergy's Technology and Service Offerings in Home Wireless Broadband Environment' [online] Sep. 12, 2000 [retrieved on Mar. 2, 2006]. Retrieved from the Interent: <URL:http//proquest.umi.com/pqdweb?did=59949829 &sid=1&Fmt=3&clientId=19649&RQT=309&VName=PQD>.*
Electronic Times: The hub of the family network—Brief Article [online]. Nov. 29, 1999 [retrieved on Jun. 7, 2006]. Retrieved from the Internet: <URL:http://www.findarticles.com/p/articles/ mi_m0WVI/is_1999_Nov_29/ai_58265896/print.☐☐☐☐☐*

(Continued)

*Primary Examiner*—Ovidio Escalante
(74) *Attorney, Agent, or Firm*—Max Stul Oppenheimer

(57) ABSTRACT

A device and process to allow remote receipt and placement of Internet Telephony connections (calls) using emulation of traditional POTS telephone service through a combination of software and a specialized cordless handset appliance. The system allows ringing and answering of inbound calls, dialing of outbound numbers, and signaling of handset status, as well as traditional telephony capabilities such as memory dialing, redial and radio channel controls. Voice control of dialing may also be implemented under software control. This system is easily adapted for operation with most PC based Internet Telephony software systems.

11 Claims, 26 Drawing Sheets

OTHER PUBLICATIONS

InnoMedia Incorporated, Innomedia partners with Chinese ISP Tekson to provide cost savings for customers. May 16, 2000.*

New York Times, Nov. 21, 2005 "Skype Says Radio Shack to Sell Kits For Its Web-Based Phone Service".

Skype web page (www.skype.com/company/news/2005/skype_radioshack.html, "RadioShack Brings Skype-Ready Products to Customers Nationwide".

Skypelight web page (www.skypelight.com/company/news/2004/rtxannouncement.html), dated Nov. 22, 2004, "RTX Telecom A/S signs marketing and license agreement with Skype enabling RTX to develop cordless Internet telephones compatible with Skype".

RTX web page (www.rtx.dk/Default.aspx?ID=143&M=News&PID=622&New) : "RTX Telecom signs marketing and license agreement with Skype" (dated Nov. 22, 2004), "RTX Pushing the Envelope in Wireless VoIP for Consumers" (dated Mar. 22, 2004) and DUALphone the world's first US DECT Cordless Phone (dated Jun. 30, 2005).

Linksys web page (www.linksys.com), Linksys and Skype Team Up to Launch New Cordless Handset to Drive Internet Phone Calling (dated Oct. 11, 2005).

Skypemart web page (www.skypemart.com/direct/skypeusa/itemdetl.isp?prod=2806. "Linksys Cordless Internet Telephony Kit", and prod=2831, "Cordless Dual Phone".

Global sources web page (www.telecom.globalsources.com/si/600881986049/ProductDet), "Dongguan Hi-Tech Digital Technology, Ltd HT-380VP VoIP Phone".

Eutectics, Inc. web page (www.eutecticsinc.com/solutions/voip/eutectics.html), IPP700—Cordless.

Topcom web page (www.topcom.net/product.php?groep=1&cat=26&catsub=84), Butler 4012USB VoIP.

Amazon.com web page (www.amazon.com/gp/product/product-description/B00005MIT), AT&T 6100 Cordless Voice-Over-Internet Telephone (Mica).

Welltec web page (www.welltech.com/product_e_09.htm), DU-100 SIP cordless phone.

* cited by examiner

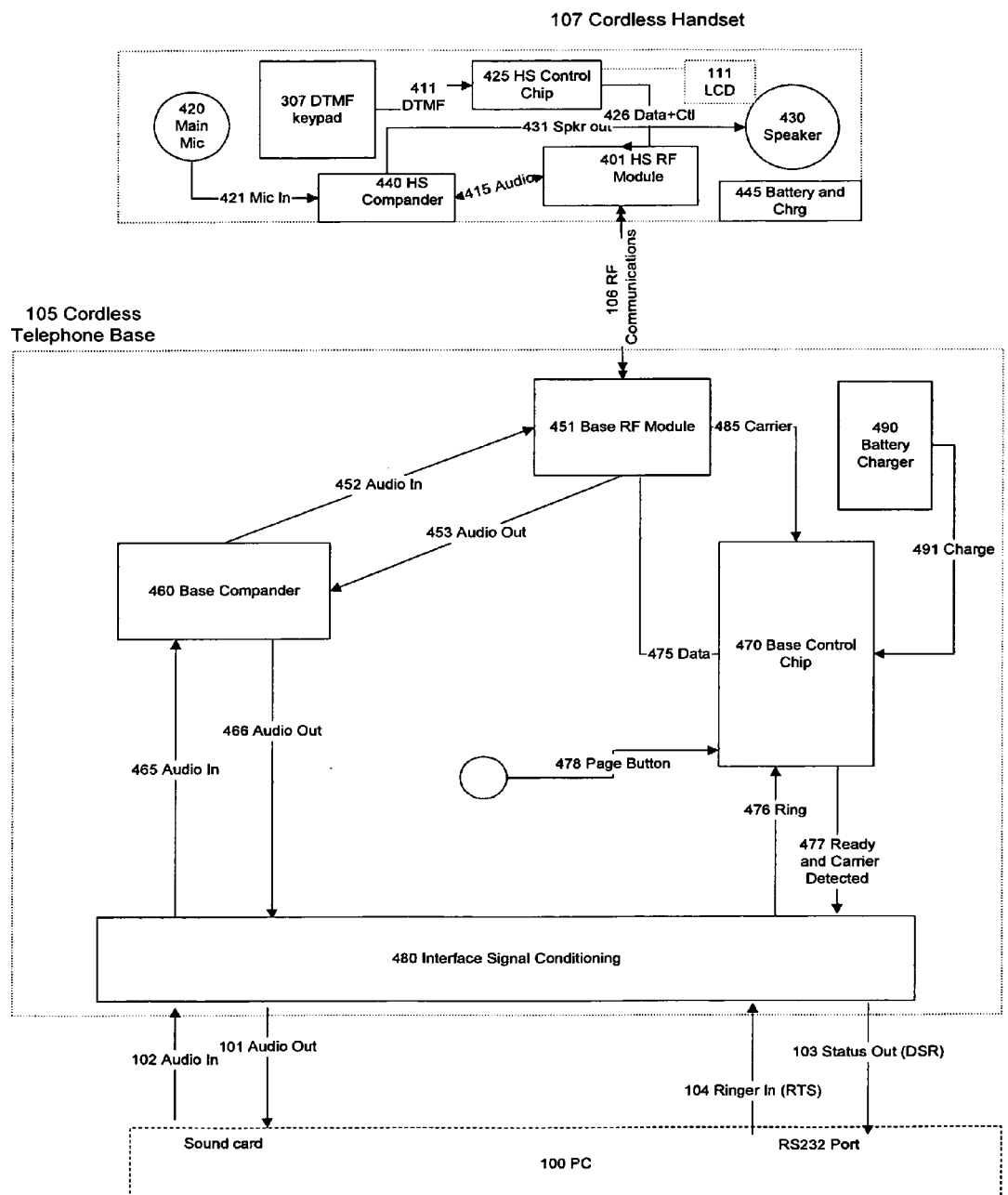

Figure 5 Graphical user interface
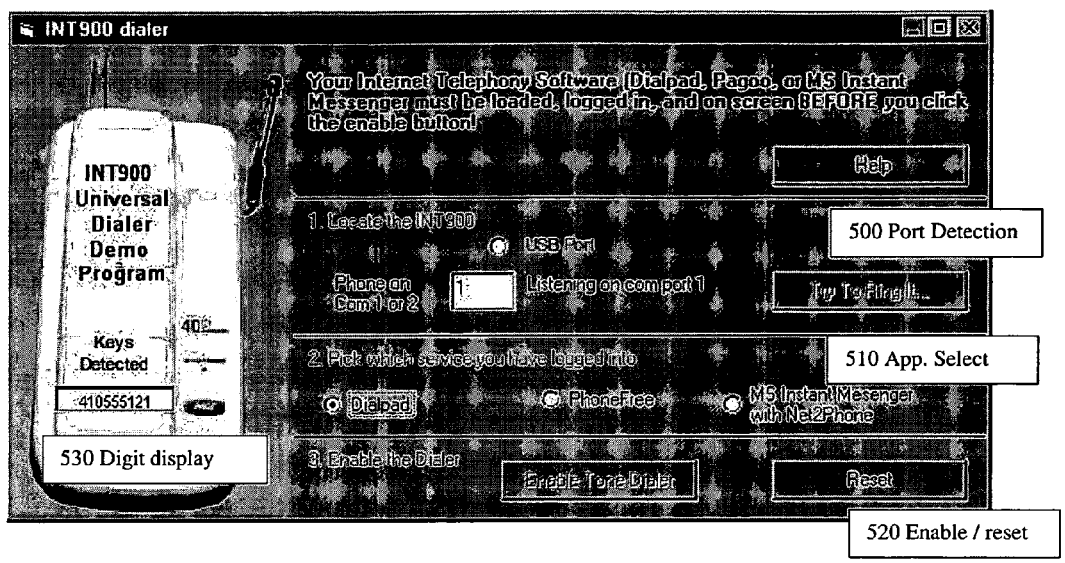

Figure 6

```
'-----------------------------------------------------------------
'Sample listing for setup of DTMF recognition and serial port operations related to use of the Cordless
Internet Telephone to emulate a POTS call using one of several service providers.

Misc. (Types, Enums, Constants...)
'-----------------------------------------------------------------

' Means to use a default or automatic value
Global Const ttAutomatic = -1

' Errors used by ttLib
Enum ttErrors
    tteNoError = 0
    tteUnknown
    tteNotSupported
    tteOutOfMemory
    tteWaveDeviceDidNotOpen
    tteWrongState
    tteBadParameter
End Enum ' Most ttLib functions return a success value
Enum ttSuccessValue
    ttscFailure = 0
    ttscSuccess = -1
End Enum ' Used by ttInitializeExInfo and ttInitialize()
Enum ttCallbackMethods
    ttcmPostMessage = 0      ' PostMessage to a given window
    ttcmSendMessage = 1      ' SendMessage to a given window ttcmDirectFunction = 2   ' Call a function DIRECTLY FROM THE RECOGNIZER THREAD
End Enum ' Used by ttInitializeEx()
Type ttInitializeExInfo
    StructSize As Long              ' LenB(ttInitializeExInfo)

CallbackMethod As ttCallbackMethods   ' Desired form of callback
    CallbackInfo1 As Long           ' If CB method is DirectFunction, this is a
                        ' Function pointer of a CallbackType function.
                        ' If CB method is Send/PostMessage, this is
                        ' the target hWnd.
    CallbackInfo2 As Long           ' If CB method is Send/PostMessage, this is the
                        ' window message to send or ttAutomatic.

MinNoise As Long        ' Noise gate level or ttAutomatic
    ToneDuration As Long        ' Number of 12.75ms sampling windows needed
```

Figure 6a

```
                        ' for tone or ttAutomatic
    SilenceDuration As Long      ' Number of 12.75ms sampling windows needed
                        ' for silence or ttAutomatic
    SignalToNoise As Long        ' Signal to noise ratio or ttAutomatic
    RowRatio As Long             ' Primary to harmonic ratio for rows or
                        ' ttAutomatic
```

Figure 6  Visual Basic Program Listing Cont

```
    ColRatio As Long             ' Primary to harmonic ratio for columns or
                        ' ttAutomatic
      DeviceOverride As Long     ' Audio input device to use or ttAutomatic
    End Type

' ----------------------------------------------------------------

' ----------------------------------------------------------------
' Interface functions
' ----------------------------------------------------------------

' You call Initialize() or InitializeEx() when you first load the DLL or
' when you want to change some of the parameters. They are NOT meant to
' be called while recognition is in progress. The results of calling them
' while recognition is in progress are undefined.
' The ttInitializeExInfo struct passed to InitializeEx() will be returned
' with all ttAUTOMATIC values replaced by their defaults. The struct can
' freed immediately.
Declare Function ttInitialize Lib "ttLib" (ByVal Method As ttCallbackMethods, ByVal CallbackInfo1 As
Long) As ttSuccessValue
Declare Function ttInitializeEx Lib "ttLib" (ttLibInitializeExInfo As ttInitializeExInfo) As ttSuccessValue ' Starts up recognition
Declare Function ttBeginRecognition Lib "ttLib" () As ttSuccessValue ' Stops recognition. Failing to call this is an easy way to crash your app.
Declare Function ttEndRecognition Lib "ttLib" () As ttSuccessValue ' Returns an error value.
Declare Function ttGetErrorVal Lib "ttLib" () As ttErrors
' ----------------------------------------------------------------

' This is the prototype to use for callbacks functions. With VB6, this is
' useless unless you really know what you're doing. With VB5, it should
' be a breeze.
' Sub CallbackProc(ByVal Char As Byte)
```

Figure 6b

'The following Communications constants are from win32api.txt:
-----------------------------------------------------------------

'EscapeCommFunction values
Global Const SETXOFF = 1
Global Const SETXON = 2
Global Const SETRTS = 3
Global Const CLRRTS = 4
Global Const SETDTR = 5
Global Const CLRDTR = 6
Global Const RESETDEV = 7
Global Const GETMAXLPT = 8
Global Const GETMAXCOM = 9
Global Const GETBASEIRQ = 10

-----------------------------------------------------------------

'Global variables & constants

Public CommPorts() As String
Public PortExists As Boolean
Public Com1PortInUse As Boolean
Public Com2PortInUse As Boolean
Public PortNumber As Integer
Public PortOpen As Boolean
Public NumberOfPorts As Integer Public ValidPort As Boolean
Public dtmf As String
Public getting_tone As Boolean 'API declares:

Declare Function PlaySound _
    Lib "winmm.dll" _
    Alias "PlaySoundA" _
    (ByVal lpszName As String, ByVal hModule As Long, ByVal dwFlags As Long) As Long Public Declare Function EscapeCommFunction _
    Lib "kernel32" _
    (ByVal nCid As Long, _
    ByVal nFunc As Long) _
    As Long

Figure 6c

Public Declare Function timeGetTime _
   Lib "winmm.dll" () _
   As Long

---

Public Sub Delay(DelayInMilliseconds As Single)
'Delay timer with approximately 1-msec. resolution.
'Uses the API function timeGetTime.
'Rolls over 24 days after the last Windows startup.
Dim Timeout As Single
Timeout = DelayInMilliseconds + timeGetTime()
Do Until timeGetTime() >= Timeout
   DoEvents
Loop
End Sub

---

Public Sub ShutDown()
'Close the port.
If Form1.MSComm1.PortOpen = True Then
   Form1.MSComm1.PortOpen = False
End If
End Sub

---

Private Const WM_LBUTTONUP = &H202
Public dialing As Boolean
Public dialtoneplaying As Boolean
Public talking As Boolean

---

Private Sub CallbackTarget_MouseUp(Button As Integer, Shift As Integer, X As Single, Y As Single)
  ' When the recognizer gets a valid tone, it sends a window message with
  ' both the LPARAM and the WPARAM as the ASCII value of the key. Since we
  ' specified WM_LBUTTONUP as the message and CallbackTarget.hWnd as the window
  ' in our call to ttInitializeEx() -- this MouseUp event ends up firing when
  ' a key is recognized!
  ' For a normal WM_LBUTTONUP message, the X position of the mouse is in the
  ' low word of the LPARAM. Since VB uses that for the X parameter... the
  ' key's ASCII value is now in X! Note that CallbackTarget's ScaleMode is
  ' vbPixels. If it was something else, VB would have multipled the real
  ' low word of LPARAM by something to make X (i.e., if ScaleMode = vbTwips,
  ' we'd want to do txtKeys.SelText = Chr$(X \ Screen.TwipsPerPixelx)). Don't
  ' sweat it. Just make sure your callback target's ScaleMode is vbPixels!

Figure 6d

```
    Status.SelStart = Len(Status.Text)
    Status.SelText = Chr$(X)
End Sub
```

---

```
Private Sub EnableDialer_Click()

If PickMSIM.Value = False And PickDialpad.Value = False And PickPhoneFree.Value = False Then
        MsgBox "You must select a program first"
        Exit Sub
    End If PortNumber = Text1.Text
    If Form1.MSComm1.PortOpen = True Then Form1.MSComm1.PortOpen = False
    Form1.MSComm1.CommPort = PortNumber
    If Form1.MSComm1.PortOpen = False Then Form1.MSComm1.PortOpen = True

---

'start capturing tones

If ttBeginRecognition = ttscFailure Then
            MsgBox "Failed to start DTMF recognition! Is your sound system in use by another program?" & _
    vbNewLine & "Error " & CStr(ttGetErrorVal), vbExclamation
            Exit Sub
        End If
    Status.Text = ""
    dialing = True
    If PickDialpad.Value = True Then Timer1.Enabled = True
    If PickMSIM.Value = True Then Timer2.Enabled = True
    If PickPhoneFree.Value = True Then Timer3.Enabled = True
    EnableDialer.Enabled = False
    Command2.Enabled = False
    Text1.Enabled = False
    Text2.Text = "Listening on com port " & PortNumber End Sub

---

Private Sub Command2_Click()
PortNumber = Text1.Text
Call ringit
Call ringit ' sometimes the detection circuit needs a second ring
End Sub
```

Figure 6e

```
Private Sub ringit()
'rings the handset until answered
If MSComm1.PortOpen = True Then MSComm1.PortOpen = False
'Change Comm port here
MSComm1.CommPort = PortNumber
If MSComm1.PortOpen = False Then MSComm1.PortOpen = True
Dim Commhandle As Long
Commhandle = Form1.MSComm1.CommID Do
   Dim Timeout As Single
   Timeout = timeGetTime() + 500
   Do
      RTSOn = SETRTS
      Success = EscapeCommFunction(Commhandle, RTSOn)
      Delay (25)
      RTSOn = CLRRTS
      Success = EscapeCommFunction(Commhandle, RTSOn)
      Delay (25)
   Loop While (timeGetTime() <= Timeout)
Delay (1000)
'Wait for off hook
Loop While MSComm1.DSRHolding = True
If MSComm1.PortOpen = True Then MSComm1.PortOpen = False End Sub
```

```
Private Sub Reset_Click()
'reset everything and stop timers
   ttEndRecognition
   If Form1.MSComm1.PortOpen = True Then Form1.MSComm1.PortOpen = False
   Call dialtone_off
   Timer1.Enabled = False
   Timer2.Enabled = False
   Timer3.Enabled = False
   EnableDialer.Enabled = True
   Command2.Enabled = True
   Delay (1000) 'give the phone a second to settle in case they just hung up
   Call Text1_Change
End Sub
```

Figure 6f

```
Private Sub Command4_Click()
  Dim htmlpath
  htmlpath = App.Path & "\index.html"
  frmBrowser.StartingAddress = htmlpath
  frmBrowser.Show
End Sub
```

----

```
Private Sub Form_Load()
'set up state variables
  dialing = False
  dialtoneplaying = False
  talking = False
  Text1.Text = 1
  PortNumber = Text1.Text
  Call Text1_Change
```
----

```
'set up dtmf detector
Dim IEI As ttInitializeExInfo
  With IEI
    .StructSize = LenB(IEI)

.CallbackMethod = ttcmPostMessage

' CallbackInfo1 is the target window for window-based callbacks
    .CallbackInfo1 = CallbackTarget.hWnd ' CallbackInfo2 is the WM to send for window-based callbacks
    .CallbackInfo2 = WM_LBUTTONUP ' Use the defaults...
    .ColRatio = ttAutomatic
    .DeviceOverride = ttAutomatic
    .MinNoise = ttAutomatic
    .RowRatio = ttAutomatic
    .SignalToNoise = ttAutomatic
    .SilenceDuration = ttAutomatic
    .ToneDuration = ttAutomatic
  End With If ttInitializeEx(IEI) = ttscFailure Then
    MsgBox "Failed to initialize ttLib!" & vbNewLine & "Error " & CStr(ttGetErrorVal), vbExclamation
    Unload Me
    Exit Sub
  End If ' ttInitializeEx will have filled in all the ttAutomatic values, so
' we can see what they are now if you uncomment the box below...
'MsgBox "Tone duration is " & Format$(IEI.ToneDuration * 12.75, "#.##") & vbNewLine & _
```

Figure 6g

```
"Silence duration is " & Format$(IEI.SilenceDuration * 12.75, "#.##"), _
vbInformation, "Info"

End Sub

---------------------------------------------------------------
Private Sub PickDialpad_Click()
   PickMSIM.Value = False
   PickPhoneFree.Value = False
End Sub
---------------------------------------------------------------
Private Sub PickMSIM_Click()
   PickDialpad.Value = False
   PickPhoneFree.Value = False
End Sub
---------------------------------------------------------------
Private Sub PickPhoneFree_Click()
   PickMSIM.Value = False
   PickDialpad.Value = False
End Sub
---------------------------------------------------------------

Private Sub Text1_Change()
' check for DSR on selected port to sense a device
'note that IR ports also give a positive response, it might not be the phone On Error Resume Next
   If Text1.Text = "" Then Exit Sub
   If Text1.Text > 0 And Text1.Text < 3 Then PortNumber = Text1.Text
   If Form1.MSComm1.PortOpen = True Then Form1.MSComm1.PortOpen = False
   Form1.MSComm1.CommPort = PortNumber
   If Form1.MSComm1.PortOpen = False Then Form1.MSComm1.PortOpen = True
   If Form1.MSComm1.DSRHolding = True Then
      Text2.Text = "Device found on port"
      Command2.Visible = True ' display a test ring button
   Else
      Text2.Text = "Device not ready or not found on com port"
      Command2.Visible = False
   End If
   If Text1.Text > 2 Then Text1.Text = 1
End Sub

---------------------------------------------------------------

Private Sub Timer1_Timer()
If dialing = True And Form1.MSComm1.DSRHolding = False Then 'check to see if I should start dialtone
```

Figure 6h

```
If dialtoneplaying = False And Status.Text = "" Then Call dialtone_on

'wait for right number of digits, and kill dialtone on the first one
If Len(Status.Text) > 0 Then
  Call dialtone_off
    If Len(Status.Text) > 9 Then
      ' recognition is ended
      ttEndRecognition
      'run the application
      AppActivate ("Dialpad.com [")
      'send it the right keystrokes to dial
      SendKeys "{TAB 13}" & "~" & "{BKSP}" & Status.Text & "~", 0
      dialing = False
      talking = True
    End If End If ' if flag = true End If 'reset everything on a hangup
If talking = True And Form1.MSComm1.DSRHolding = True Then
  talking = False
  AppActivate ("Dialpad.com [")
  SendKeys "%{F4}", 1 'alt F4 closes window
  DoEvents
  Delay (300)
  AppActivate ("Dialpad")
  SendKeys "%vr", 1
  Delay 10000
  dialing = True
  Call EnableDialer_Click
End If
If dialing = True And MSComm1.DSRHolding = True And Status.Text > "" Then
    Call dialtone_off
    Status.Text = ""
End If
End Sub
-----------------------------------------------------------------------

Private Sub Timer2_Timer()
'This timer routine is for Microsoft Instant Messenger/Net2Phone
' don't waste time if phone is on hook
If dialing = True And Form1.MSComm1.DSRHolding = False Then 'check to see if I should start dialtone
    If dialtoneplaying = False And Status.Text = "" Then Call dialtone_on 'wait for right number of digits, and kill dialtone on the first one
    If Len(Status.Text) > 0 Then
      Call dialtone_off
        If Len(Status.Text) > 10 Then
```

Figure 6i

```
        ' recognition is ended
        ttEndRecognition
        'run the application
        AppActivate ("MSN Mess")
        SendKeys "%TCD", 1
        AppActivate ("Phone Call")
        SendKeys Status.Text & "~"
        dialing = False
        talking = True
        Status.Text = ""
    End If End If ' if flag = true
End If
If talking = True And Form1.MSComm1.DSRHolding = True Then
    talking = False
    AppActivate ("Phone Call")
    SendKeys "%U", 1
    Delay (500)
    EnableDialer_Click
End If
    If dialing = True And MSComm1.DSRHolding = True And Status.Text > "" Then
        Call dialtone_off
        Status.Text = ""
    End If
End Sub
-----------------------------------------------------------------------------

Private Sub Form_Unload(Cancel As Integer)

'shut down and release audio hardware
    If Form1.MSComm1.PortOpen = True Then Form1.MSComm1.PortOpen = False
    Call dialtone_off
    ' Make sure recognition is ended!
    ttEndRecognition
End Sub -----------------------------------------------------------------------------
Private Sub dialtone_on()
'plays the dialtone wav
    On Error Resume Next
    dialtoneplaying = True
    'Declare sound playing api variables
        SND_ASYNC = &H1
        'Play the sound asynchronously -- return immediately after beginning to play the sound and have it
play in the background.
        SND_FILENAME = &H20000
        'lpszName is a string identifying the filename of the .wav file to play.
        SND_LOOP = &H8
        'Continue looping the sound until this function is called again ordering the looped playback to stop.
SND_ASYNC must also be specified.
```

Figure 6j

```
    SND_PURGE = &H40
    'Stop playback of any waveform sound. lpszName must be an empty string.Dim SYNC As Long
Dim wav As String
wav = "c:\windows\dialtone.wav"
If wav = "" Then Exit Sub
SYNC = SND_ASYNC Or SND_LOOP
Dim R As Long
R = PlaySound(wav, 0, SND_FILENAME Or SND_ASYNC Or SND_LOOP)

If R = 0 Then MsgBox ("Error! I couldn't get control of the speaker to play dialtone, but the call may still
work.  You may have to stop other audio programs or check device settings in Control panel, Multimedia,
Playback (Use preferred device only)")

End Sub
Private Sub dialtone_off()
    On Error Resume Next
    dialtoneplaying = False
    'Declare sound playing api variables
        SND_ASYNC = &H1
        'Play the sound asynchronously -- return immediately after beginning to play the sound and have it
play in the background.
        SND_FILENAME = &H20000
        'lpszName is a string identifying the filename of the .wav file to play.
        SND_LOOP = &H8
        'Continue looping the sound until this function is called again ordering the looped playback to stop.
SND_ASYNC must also be specified.
        SND_PURGE = &H40
        'Stop playback of any waveform sound. lpszName must be an empty string.Dim SYNC As Long
        SND_NODEFAULT = &H2 wav = "c:\windows\off.wav"
    R = PlaySound("", 0, SND_PURGE Or SND_NODEFAULT)
End Sub
-----------------------------------------------------------------------

Private Sub Timer3_Timer()
' this timer is for Phonefree
' don't waste time if phone is on hook If dialing = True And Form1.MSComm1.DSRHolding = False Then
'check to see if I should start dialtone If dialtoneplaying = False And Status.Text = "" Then Call dialtone_on
    'wait for right number of digits, and kill dialtone on the first one If Len(Status.Text) > 0 Then
    Call dialtone_off If Len(Status.Text) > 10 Then
        ' recognition is ended
        ttEndRecognition
        'run the application
        AppActivate ("PhoneFree")
```

Figure 6k

```
        SendKeys Status.Text & "~"
        dialing = False
        talking = True
        Status.Text = ""
    End If End If ' if flag = true
End If
If talking = True And Form1.MSComm1.DSRHolding = True Then
   talking = False ' Uncomment this when Phonefree gets their hotkeys working again
    'In the meantime, just hope the other party hangs up within 15 seconds 'AppActivate ("PhoneFree")
    'SendKeys "+H", 1
    Delay (3000)
    'SendKeys "%N", 1
    'EnableDialer_Click
    Call Reset_Click
End If
If dialing = True And MSComm1.DSRHolding = True And Status.Text > "" Then
     Call dialtone_off
     Status.Text = ""
End If
End Sub
```

Figure 7 DTMF detection software parameter tuning

| score | Noise Gate | Noise/Signal | Tone Duration | Silence Duration | Pri/Harmonic Ratio |
|---|---|---|---|---|---|
| 0 | 0 | 1 | 1 | 1 | 0 |
| 0 | 450495 | 1 | 1 | 1 | 0 |
| 0 | 0 | 1 | 1 | 1 | 25 |
| 0 | 450495 | 25 | 1 | 1 | 0 |
| 0 | 450495 | 50 | 1 | 1 | 0 |
| 0 | 1000000 | 25 | 1 | 1 | 0 |
| 0 | 1000000 | 50 | 1 | 1 | 0 |
| 0 | 0 | 1 | 10 | 1 | 12 |
| 0 | 0 | 1 | 10 | 1 | 25 |
| 0 | 495050 | 12 | 5 | 1 | 0 |
| 0 | 495050 | 12 | 10 | 1 | 0 |
| 0 | 495050 | 12 | 1 | 5 | 0 |
| 0 | 495050 | 12 | 1 | 10 | 0 |
| 0 | 495050 | 12 | 1 | 1 | 12 |
| 0 | 495050 | 12 | 1 | 1 | 25 |
| 1 | 1000000 | 1 | 1 | 1 | 0 |
| 1 | 0 | 1 | 1 | 1 | 12 |
| 1 | 450495 | 1 | 1 | 1 | 25 |
| 1 | 0 | 1 | 5 | 1 | 25 |
| 1 | 0 | 1 | 1 | 5 | 25 |
| 1 | 0 | 1 | 10 | 10 | 0 |
| 1 | 0 | 1 | 1 | 10 | 12 |
| 1 | 0 | 1 | 1 | 10 | 25 |
| 2 | 0 | 1 | 1 | 5 | 0 |
| 2 | 0 | 25 | 10 | 1 | 0 |
| 2 | 1000000 | 1 | 10 | 1 | 0 |
| 2 | 0 | 1 | 10 | 5 | 0 |
| 3 | 0 | 25 | 1 | 1 | 0 |
| 4 | 450495 | 1 | 10 | 1 | 0 |
| 4 | 0 | 25 | 1 | 10 | 0 |
| 4 | 0 | 1 | 5 | 1 | 12 |
| 5 | 0 | 1 | 1 | 10 | 0 |
| 5 | 450495 | 1 | 1 | 1 | 12 |
| 5 | 0 | 50 | 1 | 10 | 0 |
| 6 | 0 | 25 | 1 | 5 | 0 |
| 6 | 0 | 25 | 1 | 1 | 25 |
| 6 | 0 | 1 | 1 | 5 | 12 |
| 6 | 0 | 50 | 10 | 1 | 0 |
| 7 | 1000000 | 1 | 1 | 1 | 12 |
| 7 | 0 | 50 | 1 | 1 | 12 |
| 7 | 0 | 50 | 1 | 1 | 25 |
| 8 | 0 | 50 | 1 | 1 | 0 |
| 8 | 0 | 1 | 5 | 1 | 0 |
| 8 | 0 | 25 | 1 | 1 | 12 |
| 8 | 0 | 1 | 5 | 10 | 0 |
| 8 | 0 | 50 | 5 | 1 | 0 |
| 9 | 0 | 1 | 10 | 1 | 0 |

| | | | | | |
|---|---|---|---|---|---|
| 9 | 0 | 1 | 5 | 5 | 0 |
| 9 | 1000000 | 1 | 5 | 1 | 0 |
| 9 | 1000000 | 1 | 1 | 5 | 0 |
| 9 | 1000000 | 1 | 1 | 10 | 0 |
| 9 | 1000000 | 1 | 1 | 1 | 25 |
| 9 | 0 | 50 | 1 | 5 | 0 |
| 10 | 450495 | 1 | 5 | 1 | 0 |
| 10 | 450495 | 1 | 1 | 5 | 0 |
| 10 | 450495 | 1 | 1 | 10 | 0 |
| 10 | 0 | 25 | 5 | 1 | 0 |

Figure 7A

Figure 8 DTMF Detection Library function

```
// ----------------------------------------------------------------
// Main.c - Murphy McCauley
Sun, Oct 1 / 2000
// The interface and heart of ttLib
// ----------------------------------------------------------------

// ----------------------------------------------------------------
// Misc
// ----------------------------------------------------------------

// This is the main file
#define MAIN

// ----------------------------------------------------------------

// ----------------------------------------------------------------
// Includes
// ---------------------------------------------------------------- include "ttLib.h"
include "Main.h"
#include "DFT.h"
#include "Util.h"

#include <math.h>              // For floor() (I think that's all...)
#include <process.h>     // For threading
#include <mmsystem.h>    // For audio

// ----------------------------------------------------------------

// ----------------------------------------------------------------
// Callback settings (File scope variables)
// ----------------------------------------------------------------

// This is a function pointer to the function to call when a key has been
// recognized. This function implements a callback behavior.
GotKeyType          pGotKeyFunc;

// If the callback method is one that calls a function, this is a pointer to
// the function to call.
CallbackType     pCallbackFunc;

// If the callback method is one that notifies via a window, this is the
// window that recieves the notification.
HWND                pCallbackWindow;

// If the callback method is one that notifies via a window, this is the
// window message to send.
int                          pCallbackMessage;
```

// ------------------------------------------------------------
// Misc variables (File scope variables)
// ------------------------------------------------------------

// WAVEHDRs for the chunks
WAVEHDR     pWaves[NUM_CHUNKS];

// Pointer to the entire audio data buffer (for all chunks)
short * pWaveData;

// Pointers within pWaveData -- one for each chunk
short * pChunkData[NUM_CHUNKS];

// Handle of the audio input device
HWAVEIN phDev;

// The waveform format
WAVEFORMATEX pFormat;

// When TRUE, the decoding loop will exit
volatile BOOL pQuitNow = FALSE;

// Handle of the recognizer thread
HANDLE phThread;

// Audio device to open
UINT pAudioDevice = WAVE_MAPPER;

// Translates a row and column into a key
static char pKeys[4][4] = {{'1', '2', '3', 'O'}, // O - Flash Override (FO/A)
                           {'4', '5', '6', 'F'}, // F - Flash (F/B)
                           {'7', '8', '9', 'I'}, // I - Immediate (I/C)
                           {'*', '0', '#', 'P'}};// P - Priority (P/D)

// ------------------------------------------------------------

// ------------------------------------------------------------
// Recognizer settings (File scope variables)
// ------------------------------------------------------------

// This is a noise gate to stop excessively noisy signal from being
// considered as a tone candidate.
int pMinNoise = DEFAULT_MIN_NOISE;

// This is the number of sampling intervals that must pass until
// a key is considered pressed (currently a 12.75ms sampling interval
// is hard coded).  I suggest 3 -- 3 * 12.75 = 38.25
int pToneDur = DEFAULT_TONE_DURATION;

// This is the number of sampling intervals that must pass between
// keys (currently a 12.75ms sampling interval is hard coded).
```

Figure 8B

```
// I suggest 3 -- 3 * 12.75 = 38.25
int pSilenceDur = DEFAULT_SILENCE_DURATION;

// This determines how much stronger the detected tones must be
// compared with the rest of the signal. Likely range is 10 - 50.
int pSignalToNoise = DEFAULT_SIGNAL_TO_NOISE;

// These are the ratio between the primary tone and its harmonic.
// The higher they are, the stronger the primary tone must be in
// comparison, which will make the thing less likely to misfire.
// Likely range is 0 - 25. In my testing, most sources are noisy
// enough to throw this off rather easily for at least on frequency.
// I suspect this is due to the tone generators.
int pRowRatio = DEFAULT_ROW_RATIO;
int pColRatio = DEFAULT_COL_RATIO;

// -----------------------------------------------------------

// -----------------------------------------------------------
// Misc. internal functions
// ----------------------------------------------------------- int CalcNumSamples(double MS, int Rate) {
        double T;
        T = MS * (Rate / 1000.0);
        if (floor(T) < T) {
                return (int)(floor(T) + 1);
        } else {
                return (int)floor(T);
        }
} unsigned __stdcall ThreadProc (LPVOID Dummy) {
        BOOL TempB;

TempB = Recognize();

if ( (TempB == FALSE) && (gLastError == tteNoError) ) {
                SetError(tteUnknown);
        }

_endthreadex(TempB);
        return TempB; // Just for style

// -----------------------------------------------------------

// -----------------------------------------------------------
// Callback handling functions
// -----------------------------------------------------------

// These functions (xCB()) implement callback methods
```

Figure 8C

```
void SendMessageCB (char Key) {
        SendMessage(pCallbackWindow, pCallbackMessage, Key, Key);
}
void PostMessageCB (char Key) {
        PostMessage(pCallbackWindow, pCallbackMessage, Key, Key);
}
void DirectFunctionCB (char Key) {
        pCallbackFunc(Key);
}

// Used to set set up a callback method -- a fairly silly (but
// straightforward) implementation.
BOOL SetCallback(ttCallbackMethods Method, int CB) {
        switch (Method) {
                case ttcmPostMessage:
                        pCallbackWindow = (HWND)CB;
                        pGotKeyFunc = PostMessageCB;
                        if (!pCallbackWindow) {
                                SetError(tteBadParameter);
                                return FALSE;
                        }
                        break;
                case ttcmSendMessage:
                        pCallbackWindow = (HWND)CB;
                        pGotKeyFunc = SendMessageCB;
                        if (!pCallbackWindow) {
                                SetError(tteBadParameter);
                                return FALSE;
                        }
                        break;
                case ttcmDirectFunction:
                        pCallbackFunc = (CallbackType)CB;
                        pGotKeyFunc = DirectFunctionCB;
                        if (!pCallbackFunc) {
                                SetError(tteBadParameter);
                                return FALSE;
                        }
                        break;
                default:
                        SetError(tteNotSupported);
                        return FALSE;
        } return TRUE;
}
// ----------------------------------------------------------------

// ----------------------------------------------------------------
// Interface functions (prototyped in ttInterface.h)
// ----------------------------------------------------------------

TouchToneErrors EXPORT ttGetErrorVal() {
```

Figure 8D

```
        TouchToneErrorsret;
        ret = gLastError;
        gLastError = 0;
        return ret;
}

BOOL EXPORT ttInitializeEx (ttInitializeExInfo * Info) {
        SetError(tteNoError);

if (Info->StructSize != sizeof(ttInitializeExInfo)) {
                SetError(tteNotSupported);
                return FALSE;
        }
        if (!SetCallback(Info->CallbackMethod, Info->CallbackInfo1)) {
                return FALSE;
        } pCallbackMessage= autosetp(&Info->CallbackInfo2, DEFAULT_CALLBACK_MESSAGE);

pMinNoise        = autosetp(&Info->MinNoise,         DEFAULT_MIN_NOISE);
        pToneDur         = autosetp(&Info->ToneDuration, DEFAULT_TONE_DURATION);
        pSilenceDur      = autosetp(&Info->SilenceDuration,DEFAULT_SILENCE_DURATION);
        pSignalToNoise   = autosetp(&Info->SignalToNoise, DEFAULT_SIGNAL_TO_NOISE);
        pRowRatio        = autosetp(&Info->RowRatio,         DEFAULT_ROW_RATIO);
        pColRatio        = autosetp(&Info->ColRatio,         DEFAULT_COL_RATIO);

pAudioDevice     = (UINT)autosetp(&Info->DeviceOverride, DEFAULT_DEVICE);

return TRUE;
}

BOOL EXPORT ttInitialize (ttCallbackMethods Method, int CB) {
        SetError(tteNoError);

if (!SetCallback(Method, CB)) {
                return FALSE;
        } pCallbackMessage = DEFAULT_CALLBACK_MESSAGE;
        pMinNoise        = DEFAULT_MIN_NOISE;
        pToneDur         = DEFAULT_TONE_DURATION;
        pSilenceDur      = DEFAULT_SILENCE_DURATION;
        pSignalToNoise   = DEFAULT_SIGNAL_TO_NOISE;
        pRowRatio        = DEFAULT_ROW_RATIO;
        pColRatio        = DEFAULT_COL_RATIO;

pAudioDevice     = DEFAULT_DEVICE;

return TRUE;
}

BOOL EXPORT ttBeginRecognition () {
        int ThreadID;
```

Figure 8E

```
        if (phThread) {
                SetError(tteWrongState);
                return FALSE;
        } pFormat.wFormatTag = WAVE_FORMAT_PCM;
    pFormat.nChannels = 1;
    pFormat.nSamplesPerSec = 11025; // 11kHz
    pFormat.wBitsPerSample = 16;
    pFormat.nBlockAlign = (pFormat.nChannels * pFormat.wBitsPerSample) / 8;
    pFormat.nAvgBytesPerSec = pFormat.nBlockAlign * pFormat.nSamplesPerSec;
    pFormat.cbSize = 0;

if (!phDev) {
                waveInOpen(&phDev, pAudioDevice, &pFormat, 0, 0, CALLBACK_NULL);
        }
    if (!phDev) {
                SetError(tteWaveDeviceDidNotOpen);
                return FALSE;
        } waveInStart(phDev);

phThread = (HANDLE)_beginthreadex(
          NULL,
          0,
          ThreadProc,
          NULL,
          0,
          &ThreadID);

if (phThread) {
                return TRUE;
        } else {
                waveInReset(phDev);
                waveInClose(phDev);
                phDev = 0;
                return FALSE;
        }
}

BOOL EXPORT ttEndRecognition () {
        if (!phThread) {
                // It's not running!
                SetError(tteWrongState);
                return FALSE;
        }

// Tell the thread to quit
        pQuitNow = TRUE;

// Wait for the thread to finish, then clean it up
        WaitForSingleObject(phThread, INFINITE);
        CloseHandle(phThread);
```

Figure 8F

```
        phThread = NULL;

// Reset this...
        pQuitNow = FALSE;

// Close and clean up the wave device
    if (phDev) {
        waveInClose(phDev);
                phDev = NULL;
        } return TRUE;
}

// ----------------------------------------------------------------
```

REMOTE INTERNET TELEPHONY DEVICE

This application is a Continuation of U.S. Non-Provisional application Ser. No. 09/734,163 (filed Dec. 11, 2000), which was a continuation-in-part of U.S. Non-Provisional Application Ser. No. 08/734,857 (filed Oct. 23, 1996) (now U.S. Pat. No. 6,859,525 (issued Feb. 22, 2005).

FIELD AND BACKGROUND OF THE INVENTION

1. Field of the Invention

The present invention relates to the field of Internet Telephony, and in particular, the emulation of POTS call placement and receipt using a specialized remote cordless telephone handset.

2. Background Information

The recent surge in Internet Telephony software and infrastructure creation has provided the public with the ability to make and receive voice calls from a PC to other PC's and telephones. More advanced systems such as the Trident™ system developed by Pagoo also allow inbound calling from a telephone to a user PC, and similar services are expected to appear in the near future from ITXC and other Internet Telephony Service Providers. Current systems rely on audio ringing via speakers or other sound card/DSP based devices to play a ringing sound that notifies the user of an inbound call.

This has created the situation where even with volume set high, a user is required to stay within audio range of their computer to receive a call, and then quickly reduce the volume as the call is accepted, or alternatively, stay in front of the computer at any time a call is expected. There is currently no way to remotely answer an inbound call, or dial without replacing the entire PC sound system with a custom device. Even such custom devices attempt to interface a standard two wire telephone, creating the problem of echo, which most DSP based processing cannot fully eliminate. Additionally, operating a PC with multiple sound devices such as a Voice modem, Sound Card, and telephone adapter can cause massive user confusion as PC standard audio must now be mapped to the proper device for each use. The best example is the standard WAV file, which may be music, game sound effects, a Windows alert sound, Internet Telephony Voice or an Internet Telephony "Ring". Mapping of a WAV file to the correct device and maintaining those mappings is usually beyond an average user's capability, and automated mapping often has unintended and undesirable results. USB based solutions which also add an additional sound system suffer from some of the same issues, and are additionally limited by the USB specification to approximately 12 ft. range from the computer.

SUMMARY OF THE INVENTION

A specialized cordless telephone is provided with the means to signal device ready status, trigger a standard telephone ring, and transport audio, control and DTMF tones to a standard PC soundcard and I/O port. In one embodiment, a connection is made to a standard RS232 port available on most personal computers for the ring and status signal, as well as an audio connection to the microphone and speaker outputs of the pc's existing sound card. The specialized telephone is accompanied by software that provides for detecting the presence of the telephone on any port, providing ready status where "ready" is defined as either (1) on hook in base or (2) out of base, not in use with radios and security codes synchronized. The software provides an interface to standard Internet Telephony systems in the simplest possible terms which may be characterized as "Unit Ready" and "Ring Unit". The audio portion of the device operates independently, and may be used under manual control if desired. The combined hardware and software portions, allow Internet Telephony applications to sense, off hook, issue a dial tone, receive DTMF tones, and provide audible remote ring for an outbound call, as well as ring and connect inbound calls. This allows full emulation of the POTS line user experience.

Additionally, the remote handset, with a range exceeding 400 ft, may be used to trigger events and programs via DTMF tones or voice commands, monitor an audio stream such as stock market data, or even, when combined with popular home automation equipment, control appliances, lighting and other devices from anywhere within range. Further embodiments of the invention may include USB port signaling, on-board DTMF decode, on-board voice capabilities, remote LCD display, and a full IP telephony support engine integrated with the base unit to eliminate need for the PC.

It is an object of the invention to provide a device and method for remote cordless internet telephony.

It is a further object of the invention to provide a device and method for communication over a digital network wherein a handset may be located more than 12 feet from a computer providing access to the digital network.

It is a further object of the invention to provide a device and method for communication over a digital network wherein a handset may be located more than 400 feet from a computer providing access to the digital network.

BRIEF DESCRIPTION OF THE DRAWINGS

The foregoing and still other objects of this invention will become apparent, along with various advantages and features of novelty residing in the present embodiments, from study of the following drawings, in which:

FIG. 4 is a more simplified block diagram of one embodiment of the invention.

FIG. 5 is a graphical user interface window typical of an Internet telephony application driver or direct interface.

FIG. 6, 6a thru 6k is a listing of a typical Microsoft Visual Basic driver program to enable operation with several Internet telephony programs.

FIGS. 7 and 7a is a table of experimental variables in the DTMF detection algorithm that were tuned to the optimum settings for platform (PC and sound card) independence.

FIG. 8, 8a thru 8f is a listing the DTMF detection algorithm selected as optimum.

DESCRIPTION OF THE PREFERRED EMBODIMENT

In the following description of the preferred embodiment, references are made to the accompanying drawings. It is to be understood that other embodiments may be utilized and that other structural, logical and electrical changes may be made without departing from the scope of the present invention. This is to specifically include changes in packaging such as building the base electronics into a PC enclosure, or plug in card or inclusion into a monitor or other display device.

Figure 1:
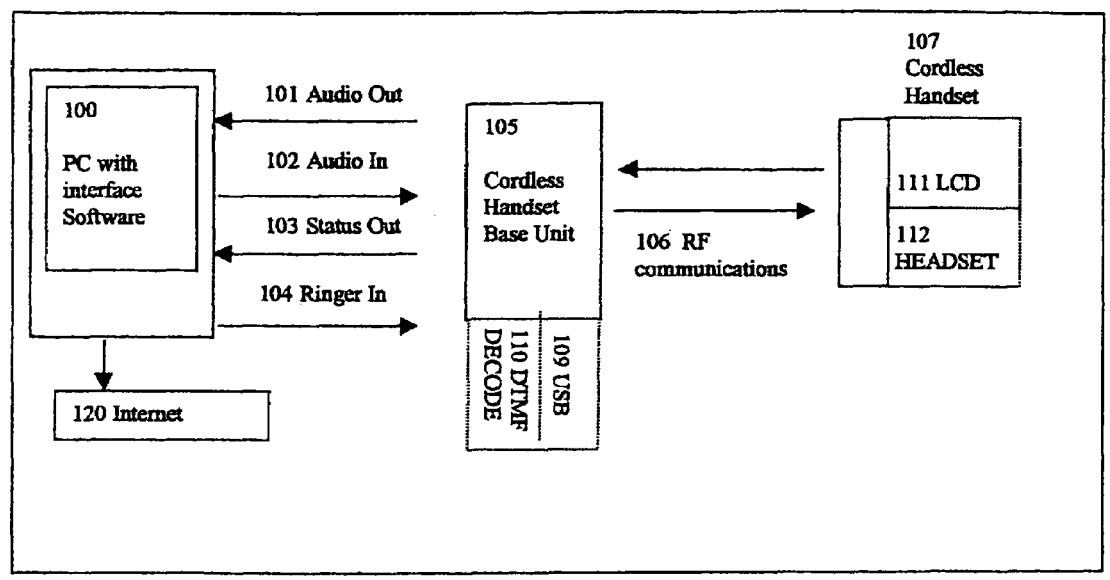
FIG. 1 is an overview block diagram of the specialized cordless telephone appliance.

In FIG. 1 an overview of a remote Internet Telephony appliance is shown generally, which in the current preferred embodiment consists of a PC 100, Cordless handset base unit 105 and cordless handset 107. In one embodiment the Base 105 and Handset 107 communicate using standard 900 mhz radios with multichannel capability, security codes and compander circuitry for noise reduction. In non-programmed operation the Audio In 102 and Audio Out 101 are always live, and capable of relaying the input/output of the PC 100 sound system to the Base 105, and if activated, the handset 107. Under program control, the PC 100 additionally monitors Status Out 103 and can produce a 20 hz square is wave on Ringer In 104 to trigger an optically isolated ring circuit in the Base 105. The Status In 105 from the base is a composite logic signal that is true if the handset is either on hook, or off hook but not in talk mode. The 20 hz ring signal is interpreted in the Base 105 as a trigger to suppress audio, enable the handset ring circuit, and engage the remote ring generator while the 20 hz input exists.

Figure 2:
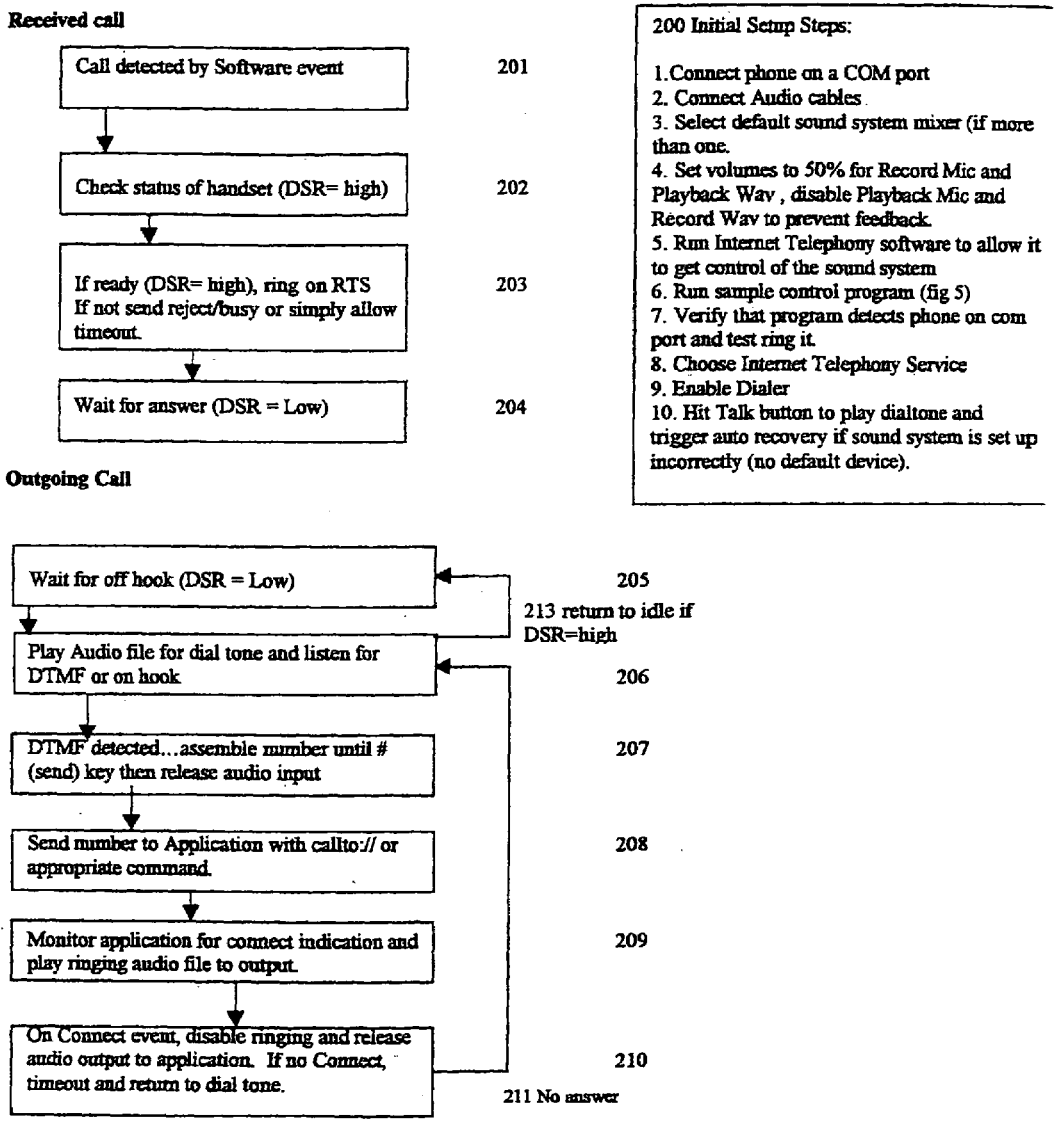
FIG. 2 is a flow chart of the interaction of software and hardware to emulate POTS line operation.

In FIG. 2 the progress of the software to emulate a POTS call is depicted. Initial Setup 200 shows the manual setup required by a user to establish the operable PC configuration. On an inbound call a software incoming call event 201 is triggered by an Internet Telephony program such as Microsoft NetMeeting, Dialpad, Pagoo ITXC WebTalk Now™, Avaya Softphone™, Microsoft Instant Messenger with Net2Phone or other software based on such technology. The appliance software verifies the status of handset 202, and following the logic in 203, either rings or rejects the incoming call. Since some Internet Telephony systems allow multiple calls, the software may optionally be configured to accept an additional inbound event, even if currently in use.

An outgoing call begins with activation of the Internet Telephony program, which automatically triggers the appliance software to enter the Wait for off hook state 205. Upon detection of a change in the Status Out 103, the program triggers Windows to play a dial tone audio file, and engages Audio In 102 monitoring 206 for DTMF tones. Fast Fourier analysis is used at 207 to detect and collect a sequence of tones, Dial tone is disengaged on the first tone detection. The collection of tones may be terminated by use of a send key or predetermined if the telephony system has a fixed length format, after which the input must be released to allow voice communication to commence, and the digits are sent in 208 to the telephony application. The appliance software may also use a sequence of digits to trigger other events, such as run a program, shut down the PC, or translate to an email address if desired or required by the Internet Telephony software. After passing a called number and event to the Internet Telephony software, the appliance software then monitors at 209 for a connection event, and plays a ring sound emulation to the Audio In 102. Detection of the connection event 210 triggers the appliance software to release control of both audio lines 101 and 102 to the Internet Telephony application and return to idle 205 upon call termination as indicated by 103 Status In transitioning to true.

Figure 3:
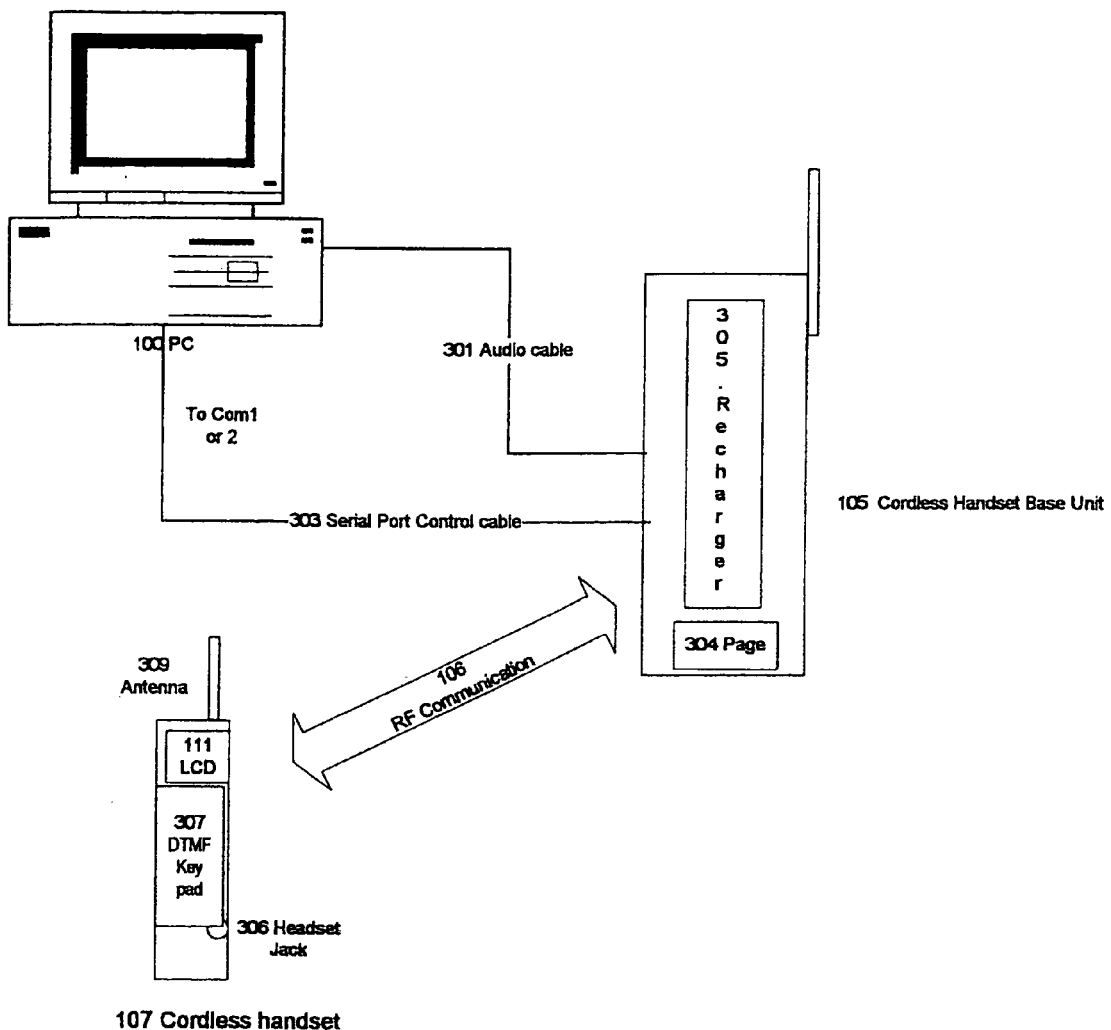
FIG. 3 is a connection diagram and block diagram of various embodiments of the invention.

FIG. 3. Depicts a preferred embodiment where PC 100 connects to the specialized handset base 105 containing recharger 305, interface electronics, and a handset page button 304, via an Audio cable 301 containing Audio in and out 102 and 101 and also a Serial Port Cable 303 containing Status and Ringer signals 103 and 104. The Handset 107 contains a DTMF Keypad 307, headset jack 306, and LCD display 111 which may be used in future embodiments for call progress and remote control application prompts.

The unit may optionally connect using a USB port to implement additional advanced features such as, but not limited to direct access to the LCD 111 from the PC.

In FIG. 4, The relevant hardware is depicted in more detail. An originated Internet telephone call begins when the user presses a Talk button on the DTMF keypad 307. This sends an off hook indication via DTMF+Control 411, to the Control Chip 425, which then causes the RF Module 401 to select a clear RF channel to the base RF Module 451 and raises the Carrier 485 signal. The Base Control Chip 470 indicates off hook via Interface Signal conditioning 480 and the Status Out line 103 to the connected PC 100. The off hook condition as indicated by Status Out 103 is time buffered by several seconds to prevent minor radio interference from causing disconnects.

The PC 100 then commences the software actions described in FIG. 2, item 206, by playing dial tone through Audio In 102 which is conditioned in 480 and sent to Base Compander 460. The Base Compander 460 compresses the audio stream and forwards it to the Base RF Module 451 via Audio In 452. The dial tone is transmitted via RF Communications 106 to the Cordless Handset 107 and received in HS RF Module 401. In one embodiment, 900 mhz RF modules are used but this is not to preclude use of other legal frequencies. The HS RF Module 401 demodulates the Audio 415 (shown as two way for simplicity) which is expanded in the HS Compander 440 and played via Spkr Out 431 to Speaker 430.

The User then proceeds with the call by dialing a number on DTMF Keypad 307 which is scanned by HS Control Chip 425 and transmitted as audio through HS RF Module 401 and RF Communications 106 to Base 105. The Base RF Module 451 decodes the Audio Out 453 which is expanded in Base Compander 460 and sent to the PC 100 via Audio Out 466, and Signal Conditioning 480, where the signal is tailored to operate with either PC line input or microphone input levels. In alternative preferred embodiments, the handset DTMF 307 may be scanned and sent by HS Control Chip 425 and Data+Ctl 426 as data, not audio, to be decoded and rendered into DTMF tones in Base 105 by Base Control Chip 470.

The PC 100 proceeds as described in FIG. 2 step 207 by rapidly performing Discrete Fourier transforms to interpret the incoming tones. Software adjustments for application name, number of tones, background level, signal to noise, harmonic level, and tone/silence duration allow the program to be tailored to the particular system in use if required. Optimum default parameters and ranges have been determined experimentally as summarized in FIG. 6. After the appropriate number of tones is collected for the selected is Internet Telephony Application, the software proceeds as in FIG. 2. Step 208 through 210 to complete the call.

At any time, the call may be terminated by the user via the Talk button on the DTMF keypad 307, or hanging up the Handset 107 in Base 105. Either action causes the HS Control Chip 425 to signal an on-hook condition to HS RF Module 401 to drop Carrier from the RF Communications 106. This results in loss of Carrier Signal in Base RF Module 451 which is communicated via Carrier line 480 to Base Control Chip 470 and further to the PC 100 via Ready and Carrier Detected 477, and Status Out 105. The PC software reacts as appropriate to terminate the existing call or abort dialing. As mentioned above, this action is time buffered several seconds to allow for momentary loss of signal without forcing immediate disconnect.

Inbound calls commence per FIG. 2 step 201 with a software event in the in use Internet Telephony software. The PC application responds to the inbound call as described in steps 202 by reading the status of Status Out 103 which is fed through Interface Signal Conditioning 480, via Ready and Carrier Detect line 477. This line is typically high (logical True) if the unit is ready to receive a call, and can be considered the equivalent of "on-hook" for a POTS telephone. If Status Out 103 is true, the software applies the 20 hz ring signal to Ringer In 104 via a precision timer program, and continues to monitor Status Out 103 for a False condition as in FIG. 2 Step 204. The Ringer In 104 signal is passed via an isolation circuit in Interface Signal Conditioning 480 to the Base Control Chip 470. The Base Control Chip 470 sends a ring command via Data 475 line to the Base RF Module 451. The ring command is demodulated by Handset RF Module 401 and interpreted by HS Control Chip 425. The HS Control Chip 425 then monitors DTMF Keypad 307 for a key press indicating that the user has answered the call. Upon detection of the key press, the handset raises Carrier 485 via the Handset Control Chip 425, Data+Ctl 426, and both RF Modules 401 and 451.

Additional features include a Page button 478, which manually triggers ringing of the Handset 107 as described above, but without the external stimulus on the Ringer In 104 line. A small display such as LCD 111 may also be optionally included for text display at the handset. The Battery and Chrg 445 circuit is included to maintain optimal battery charge in conjunction with Battery Charger 490 when Handset 107 is resting in Base 105. Main Mic 420 may also be supplemented with an additional microphone and audio subtraction circuit to reduce background noise.

FIG. 5 depicts the graphical user window of one typical embodiment of the PC software required to interface between the present invention and a Windows based PC. In Port Detection 500, the user may select a communications port, and the software will confirm presence of a device and allow a test ring to be generated, to confirm operation. The user selects an internet telephony program of choice in App. Select 510, and enables dialtone and dialing with Enable/reset 520. Detected tones are displayed in Tone Display 530, and are automatically pasted into the selected application as pseudo-keystrokes or mouseclicks as required by that specific program.

FIG. 6, 6a thru 6k is a sample listing of Visual Basic code to generate the critical functions for the user interface depicted in FIG. 5. Functions documented in the listing include location of the unit (which communications port), ringing, Internet telephony software selection, dial tone generation, tone dialing and display, reset on hangup, and remote control of the selected Internet Telephony Application. A web browser and graphical HTML help are provided for connection and setup instructions. Similar software can be easily developed is by one skilled in the art for other operating systems.

FIGS. 7 and 7a shows the summary of experimentation that was required to determine reliable DTMF detection parameters for the PC software. Since PC platforms and sound systems vary widely in performance, a group of 10 systems ranging from a low end Dell Pentium 120 with Soundblaster 16 sound to new HP Pentium III 700 systems with integrated Riptide™ sound system was selected as representative of the average user PC, and the DTMF detection tuning parameters were tested on each machine to determine if a single setting would perform well in most systems. This experimentation was performed using a variety of popular PC systems from Dell Gateway, Hewlett Packard, Compaq, and generic manufacturers, with sound systems from Creative Labs, Crystal, ESS, Riptide, Aureal, and Yamaha. Care was taken to include systems up to five years old and the most recent consumer and business models. All sound systems were configured to 50% volume levels for record and playback, Mic boost off and auto gain control off, and then tested for operation in the volume range from 20% to 75% which would be compatible with voice applications. Reliability scoring ranged from 0 (no detection) to 10 (perfect), and was used to determine that the Primary/Harmonic ratio (which would separate DTMF from similar sounds such as music) could not be used on all PC sound systems. The defaults developed in this test were then re-tested on all systems, and set as defaults in the DTMF detection code.

FIG. 8, 8a thru 8f is a listing of the C code for the DTMF detection library function after optimization. This library function can be called by any user program to detect digits, and runs continuously until stopped.

In other embodiments of the invention, a different approach was taken with respect to the audio path separation. As shown in FIG. 7, a standard Cordless Telephone Circuit 720 was modified only to the extent of adding a balanced Hybrid Circuit 710 to separate transmit and receive audio from the POTS Tip and Ring 715. The hybrid design was attempted both with a passive version built around a Midcom 82107 transformer (a model designed specifically for such a purpose), and with an active version based around a dual operational amplifier and PNP transistor driver. In the Midcom transformer based version, minimal support circuits were required, and excellent isolation from the PC was obtained, but difficulties occurred as the standard 30 db separation obtained between transmit and receive presented a problem with echo on loud (>70 db) inbound audio. As POTS lines are rung by 20 hz AC, this model could be made to ring by simply playing a 20 hz signal, however this made this model inappropriate for use where the system would also output music, which could cause occasional false rings.

While such a version would be suitable for half duplex operation, or use with a fully echo suppressed transmission media, it could not adequately fulfill a consumer level role.

Active op-amp based hybrid circuits were also developed and tested, but even though higher (40 to 50 db) audio separation was achieved, the potential for echo remained at high (>70 db) volumes, and user testing indicated that a typical user would not be likely to set proper volume levels. User tests showed that the average user responded to all sound quality issues by increasing volume, which increased echo, therefore making the hybrid circuit approach suboptimal.

In the preferred embodiment of the present invention as described in FIG. 4, The problems of echo, signaling, and sound quality are address by creation of a unique device, rather than adapting existing 2 wire telephony instruments to a computer audio environment.

The circuitry differs significantly from a standard telephone. Instead of transmit and receive audio driving a shared 48 vdc biased telephone line through a transformer, the entire circuit is separated into isolated millivolt level audio transmit and receive. The audio signals are never coupled, except as side-tone in the physical handset, so the possibility of electronically induced echo is virtually eliminated. The ringing and on/off hook functions have also been changed to 3 Vdc RS232 compatible signals and changed in character to reflect the more computer oriented "ready" signal from a simple hook relay. Ringing uses the same frequency as a standard phone, but operates at 3 vdc, not the 50–100 VAC of a phone line, and on a separate communication line from the audio signal.

As Internet telephony is digitized at the source, there is no transmission loss, and any echo will be amplified and retransmitted. This requires a solution that entirely separates transmit and receive. Past efforts in this field include using digital signal processors and pattern matching to subtract the audio signals, but the construction of a purely computer oriented device and removing the troublesome telephony signal mix provides a simpler and more effective solution. Even advanced signal processing techniques can only approximate a clean signal, where true separation provides it inherently.

The novel device described in this application overcomes the deficiencies of telephone adapters, digital signal processors, and standard audio devices such as microphone and speaker combinations, by creation of a new hardware software device that can emulate the capabilities of a sophisticated cordless telephone while retaining the interface compatibility and simplicity to work with any standard PC.

While a specific embodiment of the invention has been shown and described in detail to illustrate the application of the principles of the invention, it will be understood that the invention may be embodied otherwise without departing from such principles and that various modifications, alternate constructions, and equivalents will occur to those skilled in the art given the benefit of this disclosure. Thus, the invention is not limited to the specific embodiment described herein, but is defined by the appended claims.

What is claimed is:

1. A remote cordless Internet telephony device comprising: a remote cordless telephone comprising a remote cordless telephone handset and a remote cordless telephone base unit;

said remote cordless telephone handset comprising a microphone, a speaker, a dialpad, a handset rf transceiver for communication with a base unit transceiver, circuitry for translating audio information input to said microphone to an rf signal as an input to said handset rf transceiver, circuitry for translating input from said handset rf transceiver means to an electrical signal as an input to said speaker, and circuitry for translating a keypress on said dialpad into data representing said keypress as an input to said handset rf transceiver;

said remote cordless telephone base unit connected to a computer, comprising a base unit rf transceiver for communication with said handset rf transceiver, means for determining whether said communication represents data representing a keypress or audio information, circuitry for translating communications from said handset if transceiver into digital form for transmission to a computer, circuitry for receiving digital data from said computer and translating said digital data to a form suitable for transmission to said base unit rf transceiver, and means for transmitting signals between said base unit rf transceiver and said computer;

and a computer having a direct connection to a digital telephony network and a connection to said remote cordless telephone base unit, said computer executing software programmed to accept data from said remote cordless telephone base unit, transmit audio information input from said remote cordless telephone base unit to said digital telephony network, receive audio information input from said digital telephony network, convert said audio information input to a form suitable for said remote cordless telephone base unit and transmit said audio information input to said cordless telephone base unit;

wherein said software is compatible with telephony software utilized by Internet telephony providers so as to allow emulation of a cordless POTS telephone call over the Internet;

whereby one user may carry on a voice conversation with a second user over said digital telephony network.

2. A device as in claim 1 having an effective range between said remote cordless handset and said remote cordless telephone base of more than twelve feet.

3. A device as in claim 1 having an effective range between said remote cordless handset and said remote cordless telephone base of more than 400 feet.

4. A device as in claim 1 wherein said connection between said computer and said remote cordless telephone base unit comprises an RS232 for ring and status signal and a computer sound card.

5. A device as in claim 1 wherein said connection between said computer and said remote cordless telephone base unit comprises a Universal Serial Bus for ring and status signal and a computer sound card.

6. A device as in claim 1 wherein said software is programmed to detect the presence of the remote cordless telephone on any port, providing ready status where "ready" is defined as either (1) on hook in base or (2) out of base, not in use with radios and security codes synchronized.

7. A device as in claim 1 wherein said remote cordless base unit comprises circuits separated into isolated millivolt level audio transmit and receive.

8. A device as in claim 1 wherein ringing information operates at 3 vdc, and on a separate communication line from the audio signal.

9. A device as in claim 1 further comprising the functions of voicemail navigation, or selections from a telephone system auto-attendant.

10. A device as in claim 1 wherein said connection between said computer and said remote cordless telephone base unit comprises a USB port.

11. A device as in claim 1 wherein said connection between said computer and said remote cordless telephone base unit comprises a serial port.

* * * * *